(12) United States Patent
Bejerano et al.

(10) Patent No.: US 8,699,438 B2
(45) Date of Patent: Apr. 15, 2014

(54) METHOD AND APPARATUS FOR IMPROVED PAGING IN WIRELESS COMMUNICATION

(75) Inventors: Yigal Bejerano, Springfield, NJ (US);
Katherine Guo, Scotch Plains, NJ (US);
Thyagarajan Nandagopal, Edison, NJ (US)

(73) Assignee: Alcatel Lucent, Paris (FR)

( * ) Notice: Subject to any disclaimer, the term of this patent is extended or adjusted under 35 U.S.C. 154(b) by 179 days.

(21) Appl. No.: 13/249,593

(22) Filed: Sep. 30, 2011

(65) Prior Publication Data

US 2012/0082141 A1   Apr. 5, 2012

Related U.S. Application Data

(60) Provisional application No. 61/388,319, filed on Sep. 30, 2010.

(51) Int. Cl.
*H04Q 7/00* (2006.01)
*H04W 72/04* (2009.01)
*H04W 84/08* (2009.01)

(52) U.S. Cl.
CPC ............. *H04W 72/04* (2013.01); *H04W 84/08* (2013.01)
USPC .......................................... 370/329; 370/341

(58) Field of Classification Search
CPC .................................................... H04W 72/04
USPC ............... 370/310–350; 455/402, 422.1–450
See application file for complete search history.

(56) References Cited

U.S. PATENT DOCUMENTS

| | | | |
|---|---|---|---|
| 2006/0156370 A1* | 7/2006 | Parantainen | 725/132 |
| 2009/0239555 A1* | 9/2009 | Sim et al. | 455/458 |
| 2010/0220680 A1* | 9/2010 | Ramankutty et al. | 370/329 |
| 2010/0260090 A1* | 10/2010 | Santhanam et al. | 370/312 |

* cited by examiner

*Primary Examiner* — Chuong T Ho
(74) *Attorney, Agent, or Firm* — J. K. Jacobs

(57) ABSTRACT

Various methods and devices are provided to address the need to reduce paging latency. In one method, a wireless network determines (201) that a page for a mobile needs to be transmitted over a target broadcast area. The wireless network schedules (202) the transmission of the page in an upcoming paging timeslot based on the target broadcast area and then pages (203) the mobile in the target broadcast area before transmitting an earlier scheduled page for another mobile with a different target broadcast area.

13 Claims, 2 Drawing Sheets

METHOD AND APPARATUS FOR IMPROVED PAGING IN WIRELESS COMMUNICATION

REFERENCE(S) TO RELATED APPLICATION(S)

The present application claims priority from a provisional application Ser. No. 61/388,319, entitled "METHOD FOR IMPROVED MOBILE PAGING IN WIRELESS COMMUNICATION," filed Sep. 30, 2010, which is commonly owned and incorporated herein by reference in its entirety.

FIELD OF THE INVENTION

The present invention relates generally to communications and, in particular, to paging in wireless communication systems.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

In cellular networks (such as 3G networks, UMTS networks, LTE networks, or network variants thereof), a mobile is in one of three states: active, inactive/detached, or sleep/idle. In active mode, the mobile has a bearer channel that it uses to send/receive data to/from the base station (BS). In inactive mode, the mobile does not have a bearer channel, but it is listening to the downlink control channel and is able to participate in the uplink control channel when needed. In sleep mode, the mobile is only listening the paging channel. When there is data to be sent to the mobile, the Mobility Management Element (MME) tries to contact the mobile over the paging channel, by broadcasting the mobile's identifier (EMSI/IMEI). In response, the mobile wakes up, acknowledges the wakeup call to the MME, and then attempts to receive the data from the BS.

In high-load situations, where the MME is suddenly faced with an onslaught of data for multiple mobiles, it has to wakeup all of these mobiles as soon as possible. In a typical network with N mobiles, the system is designed to handle M simultaneous users, where M is approximately N/10. In overload situations, sometimes the BS is faced with a high number of users, for example, M>N/4. In such situations, most of the mobiles are in sleep mode, and the MME has to activate all of these mobiles in order to deliver their messages. The time taken to do this in sequential fashion (as is done presently) can be on the order of seconds, and this performance degrades heavily under load. Thus, new solutions and techniques that are able to reduce paging latency, at least in certain situations, would meet a need and advance wireless communications generally.

Figure 1:
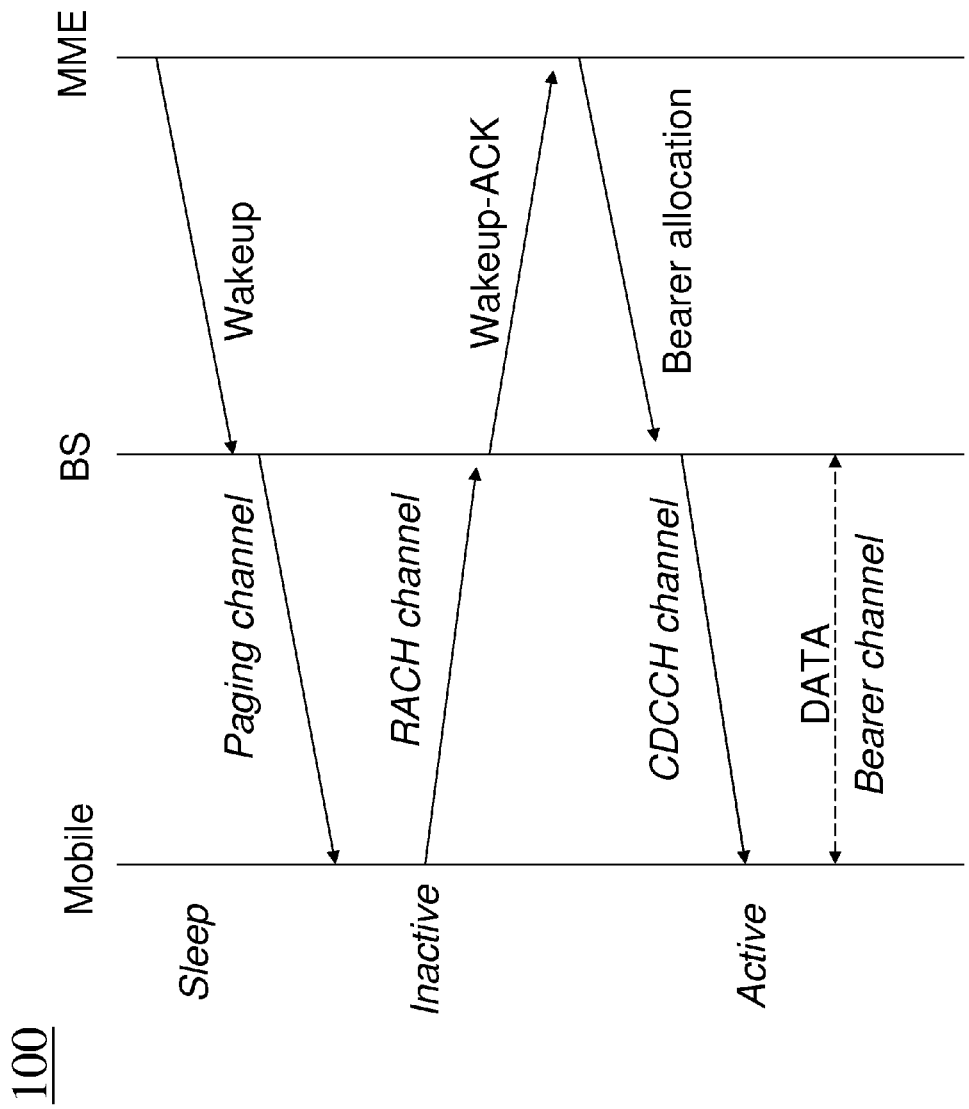
FIG. 1 is a messaging flow diagram depicting the paging of a mobile.

Specific embodiments of the present invention are disclosed below with reference to FIGS. 1 and 2. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the logic flow diagrams above are described and shown with reference to specific steps performed in a specific order, some of these steps may be omitted or some of these steps may be combined, sub-divided, or reordered without departing from the scope of the claims. Thus, unless specifically indicated, the order and grouping of steps is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY OF THE INVENTION

Various methods and devices are provided to address the need to reduce paging latency. In one method, a wireless network determines that a page for a mobile needs to be transmitted over a target broadcast area. The wireless network schedules the transmission of the page in an upcoming paging timeslot based on the target broadcast area and then pages the mobile in the target broadcast area before transmitting an earlier scheduled page for another mobile with a different target broadcast area. An article of manufacture is also provided, the article comprising a processor-readable storage medium storing one or more software programs which when executed by one or more processors performs the steps of this method.

Many embodiments are provided in which the method above is modified. For example, in many embodiments scheduling the transmission of the page in the upcoming paging timeslot based on the target broadcast area involves determining, by the wireless network, that the target broadcast area does not overlap with a target broadcast area of any other pages scheduled in the upcoming paging timeslot. It may also be the case that the different target broadcast area of the earlier scheduled page does overlap with a target broadcast area of another page scheduled in the upcoming paging timeslot.

In many embodiments, the wireless network transmits pages using a paging queue in First-In-First-Out (FIFO) order except when a later-queued page can be transmitted before an earlier-queued page based on a target broadcast area of the later-queued page. In some embodiments, this transmitting pages using a paging queue in FIFO order involves determining, by the wireless network, that the target broadcast area of the later-queued page does not overlap with a target broadcast area of any other pages scheduled in the same paging timeslot as the later-queued page. And it may also be the case that the target broadcast area of the earlier-queued page does overlap with a target broadcast area of another page scheduled in the same paging timeslot as the later-queued page. Furthermore, in many embodiments, the transmission of the earlier-queued page is not delayed by transmitting the later-queued page before the earlier-queued page.

A wireless network equipment apparatus is also provided. The wireless network equipment being configured to communicate with other devices in the system and being operative to determine that a page for a mobile needs to be transmitted over a target broadcast area. The wireless network equipment being further configured to schedule the transmission of the page in an upcoming paging timeslot based on the target broadcast area and to then page the mobile in the target broadcast area before transmitting an earlier scheduled page for another mobile with a different target broadcast area. Many embodiments are provided in which this wireless network equipment is modified. Examples of such embodiments can be found described above with respect to the method.

Various wireless network equipment architectures may be used to implement this paging technique. For example, it may be performed by a single device, or multiple devices, such as a mobility management element and/or one or more base stations, the devices acting either individually or in a distributed manner.

DETAILED DESCRIPTION OF EMBODIMENTS

To provide a greater degree of detail in making and using various aspects of the present invention, a description of our approach to reducing paging latency and a description of certain, quite specific, embodiments follows for the sake of example. FIG. 1 is referenced in an attempt to illustrate some examples of specific problems that specific embodiments of the present invention may address.

In cellular networks, there are typically multiple BSs under the control of a single MME. When packets (e.g., data and/or voice) arrive for multiple sleeping users simultaneously, the MME issues a page request for each mobile in sleep mode. Each page is associated with a geographical "area of interest" where the mobile is likely to be found. The MME informs all BSs in the area of interest to page the mobile. If the mobile is not found in a given round of pages, the area of interest is modified to another region not covered in the original page for that mobile. In each paging round, each BS broadcasts a list of mobiles in sleep mode that it is looking for.

Messaging flow diagram 100 of FIG. 1 depicts such an approach to paging. In this approach, the page for a single mobile is sent over a large area, near where the mobile was last seen. If the mobile does not answer, the page is sent over the entire area of the RNC/MME, in order to reach the mobile. When the BS sends the page to the mobile, the mobile answers back by participating in a random access channel (RACH), and sends an acknowledgement back to the MME. In addition, the mobile starts listening to the CDCCH/CUCCH channels, which are control channels that provide channel information for downlink and uplink data traffic respectively. The MME, upon receipt of this acknowledgement, will assign appropriate data channels to the mobile and send this information to the mobile via the CDCCH channel. Data transfer now proceeds using the channels assigned to the mobile by the MME.

Although there are variations to this paging approach, the variations differ primarily in how well a mobile can be localized (i.e., maximizing the probability of identifying a mobile in a given cell), how often the mobile needs to update its location (update cost), and over how wide an area (number of BSs) a page should be sent (i.e., paging cost).

The common thread among all of these approaches is that each mobile is paged in sequential order. In other words, if the MME has a list of mobiles to page, then it sends this list of mobiles to different base stations, such that each mobile is paged at least once over at least one BS.

When the paging queue is backlogged, i.e., when a relatively large number of paging requests are pending, then the MME can optimize the paging load by re-arranging the paging queue. The motivation behind this is the following: Each page has a defined broadcast area, i.e., region of interest (ROI). If a user is not found in a ROI after a page, then the ROI is modified to include a larger area (perhaps excluding the area already paged). If the ROI of two different users overlap, then they cannot be paged in the same slot and therefore, will have to be sent sequentially.

Therefore, one optimization that may performed, depending on the embodiment of this approach, is to re-arrange the paging queue to maximize the number of pages sent in a single slot. This might cause pages for users with a very large ROI to get delayed. This also imposes a delay bound for any page to be sent out. We define a paging delay bound, Dp, for any single paging message. While current network operators impose an overall user-paging-delay (that defines the maximum latency for identifying a user via multiple pages), there is no per-page latency bound in place in current networks. This is because paging queues are generally based on a First-In-First-Out (FIFO) model.

A Best-Fit paging queue re-ordering algorithm is shown below, and is executed each time new paging requests are added to the paging queue. In the first execution of the algorithm, when the paging queue is empty, the last optimized position, last_opt=0.

```
1.   Given a per-page delay bound Dp, last optimized position
     (last_opt) and a set of page requests for 'i' users, p1, p2, ..., pi,
     each with ROI defined as r(1), r(2), ..., r(i), respectively. The
     paging time slot assigned to pi is given by t(i).
2.   j = i
3.     while (j > last_opt )
4.         t = 1
5.         while (t > 0)
6.             K = set of all users whose pages are scheduled in
                   time slot t.
7.             R = set union of r(m), for all users m ∈ K.
8.             if r(j) ∩ R = Φ (empty set), then
9.                 add pj to time slot t.
10.                break
11.            t = t+1
12.        continue
13. j = j − 1
14.    continue
```

Property 1: The per-page delay of any paging message in the Best-Fit algorithm described above is no greater than the per-page delay achieved by using a FIFO queue.

Proof: As can be seen in the algorithm above, a page is never moved back from its paging slot. Only new page messages are brought from behind to fill in existing time slots. This implies that the delay for any page will never increase to more than that of the standard FIFO queue.

However, by using an approach such as that described above some pages will be transmitted sooner than they would with standard FIFO queuing. In this way, the overall paging latency can be reduced.

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

Figure 2:
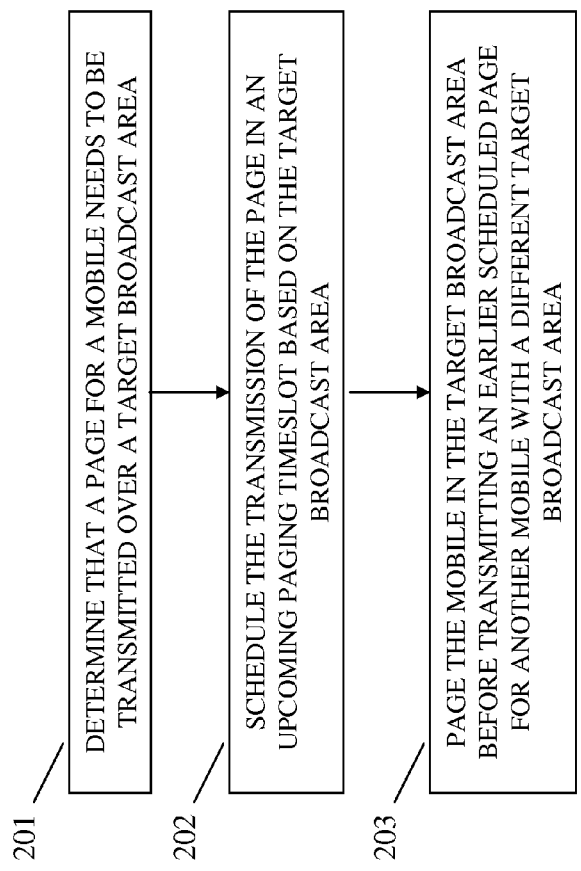
FIG. 2 is a logic flow diagram of functionality performed by a wireless network in accordance with various embodiments of the present invention.

Aspects of embodiments of the present invention can be understood with reference to FIG. 2. Diagram 200 of FIG. 2 is a logic flow diagram of functionality performed by a wireless network in accordance with various embodiments of the present invention. In the method depicted in diagram 200, a wireless network determines (201) that a page for a mobile needs to be transmitted over a target broadcast area. The wireless network schedules (202) the transmission of the page in an upcoming paging timeslot based on the target broadcast area and then pages (203) the mobile in the target broadcast area before transmitting an earlier scheduled page for another mobile with a different target broadcast area.

In many embodiments, the wireless network transmits pages in FIFO order using a paging queue except when a later-queued page can be transmitted before an earlier-queued page, based on a target broadcast area of the later-queued page. In some embodiments, this involves determining, by the wireless network, that the target broadcast area of the later-queued page does not overlap with a target broadcast area of any other pages scheduled in the same paging timeslot as the later-queued page. The earlier-queued page is not transmitted sooner because the target broadcast area of the earlier-queued page does overlap with a target broadcast area of another page scheduled in the same paging timeslot as the later-queued page. However, the transmission of the earlier-queued page is not delayed by transmitting the later-queued page before the earlier-queued page.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method for improved paging, the method comprising:
    determining, by a wireless network, that a page for a mobile needs to be transmitted over a target broadcast area;
    scheduling, by the wireless network, the transmission of the page in an upcoming paging timeslot based on the target broadcast area;
    paging, by the wireless network, the mobile in the target broadcast area before transmitting an earlier scheduled page for another mobile with a different target broadcast area;
    transmitting pages using a paging queue in First-In-First-Out (FIFO) order except when a later-queued page can be transmitted before an earlier-queued page based on a target broadcast area of the later-queued page.

2. The method as recited in claim 1, wherein scheduling the transmission of the page in the upcoming paging timeslot based on the target broadcast area comprises
    determining, by the wireless network, that the target broadcast area does not overlap with a target broadcast area of any other pages scheduled in the upcoming paging timeslot.

3. The method as recited in claim 2, wherein the different target broadcast area of the earlier scheduled page does overlap with a target broadcast area of another page scheduled in the upcoming paging timeslot.

4. The method as recited in claim 1, wherein transmitting pages using a paging queue in FIFO order except when a later-queued page can be transmitted before an earlier-queued page comprises
    determining, by the wireless network, that the target broadcast area of the later-queued page does not overlap with a target broadcast area of any other pages scheduled in the same paging timeslot as the later-queued page.

5. The method as recited in claim 4, wherein the target broadcast area of the earlier-queued page does overlap with a target broadcast area of another page scheduled in the same paging timeslot as the later-queued page.

6. The method as recited in claim 1, wherein the transmission of the earlier-queued page is not delayed by transmitting the later-queued page before the earlier-queued page.

7. An article of manufacture comprising a non-transitory processor-readable storage medium storing one or more software programs which when executed by one or more processors performs the steps of the method of claim 1.

8. Wireless network equipment in a communication system, the wireless network equipment being configured to communicate with other devices in the system, wherein the wireless network equipment is operative to determine that a page for a mobile needs to be transmitted over a target broadcast area, to schedule the transmission of the page in an upcoming paging timeslot based on the target broadcast area, to page the mobile in the target broadcast area before transmitting an earlier scheduled page for another mobile with a different target broadcast area, and to transmit pages using a paging queue in First-In-First-Out (FIFO) order except when a later-queued page can be transmitted before an earlier-queued page based on a target broadcast area of the later-queued page.

9. The wireless network equipment as recited in claim 8, wherein being operative to schedule the transmission of the page in the upcoming paging timeslot based on the target broadcast area comprises being operative to determine that the target broadcast area does not overlap with a target broadcast area of any other pages scheduled in the upcoming paging timeslot.

10. The wireless network equipment as recited in claim 9, wherein the different target broadcast area of the earlier scheduled page does overlap with a target broadcast area of another page scheduled in the upcoming paging timeslot.

11. The wireless network equipment as recited in claim 8, wherein being operative to transmit pages using a paging queue in FIFO order except when a later-queued page can be transmitted before an earlier-queued page comprises being operative to determine that the target broadcast area of the later-queued page does not overlap with a target broadcast area of any other pages scheduled in the same paging timeslot as the later-queued page.

12. The wireless network equipment as recited in claim 11, wherein the target broadcast area of the earlier-queued page does overlap with a target broadcast area of another page scheduled in the same paging timeslot as the later-queued page.

13. The wireless network equipment as recited in claim 8, wherein the transmission of the earlier-queued page is not delayed by transmitting the later-queued page before the earlier-queued page.

* * * * *